(12) United States Patent
Lischer et al.

(10) Patent No.: US 6,993,973 B2
(45) Date of Patent: Feb. 7, 2006

(54) CONTAMINANT DEPOSITION CONTROL BAFFLE FOR A CAPACITIVE PRESSURE TRANSDUCER

(75) Inventors: D. Jeffrey Lischer, Acton, MA (US); Robert Traverso, Belmont, MA (US)

(73) Assignee: MKS Instruments, Inc., Andover, MA (US)

( * ) Notice: Subject to any disclaimer, the term of this patent is extended or adjusted under 35 U.S.C. 154(b) by 94 days.

(21) Appl. No.: 10/440,391

(22) Filed: May 16, 2003

(65) Prior Publication Data

US 2004/0226382 A1 Nov. 18, 2004

(51) Int. Cl.
*G01L 9/12* (2006.01)

(52) U.S. Cl. .............................. 73/724; 73/700; 73/715; 73/718; 361/280; 361/283.4

(58) Field of Classification Search ........... 73/700–724; 361/280–283.4
See application file for complete search history.

(56) References Cited

U.S. PATENT DOCUMENTS

| | | | |
|---|---|---|---|
| 2,416,557 A | 2/1947 | Wiener | |
| 2,800,796 A | 8/1952 | Westcoff et al. | |
| 2,751,530 A | 6/1956 | Armstrong | |

(Continued)

FOREIGN PATENT DOCUMENTS

| | | |
|---|---|---|
| DE | 1 282 302 | 11/1968 |
| DE | 4 136 995 A | 5/1993 |
| DE | 4207951 | 9/1993 |
| EP | 275 844 | 7/1988 |

(Continued)

OTHER PUBLICATIONS

Baratron® Absolute Pressure Transmitters–400 Series, 1996, MKS Instruments, Andover, MA (No. M.).
Baratron® General Purpose Absolute Pressure Transducers, 1993, MKS Instruments, Inc. (No. mo.).
Derwent's Abstract, No. 88–197466/28, week 8828, Abstract of SU, 1362971, Dec. 30, 1987.
Derwent's Abstract, No. 91–199892/27, week 9127, Abstract of SU, 1605145, Nov. 7, 1990.
Bal Sal Engineering Company, Inc., Santa Ana, California, Bal Seal Decanted Coil Spring Gaskets, pp. 3.2–2 and 3.2–14.
Beynon, J.D.E. et al., "A Simple micromanometer," 1964, J. Sci. Instruments, vol. 41(2), pp. 11–112.

(Continued)

*Primary Examiner*—Edward Lefkowitz
*Assistant Examiner*—Alandra Ellington
(74) *Attorney, Agent, or Firm*—Wilmer Cutler Pickering Hale and Dorr LLP (57) ABSTRACT

The disclosed transducer includes a housing, a diaphragm, an inner conductor, an outer conductor, and a first baffle. The housing defines an interior volume. The diaphragm is disposed in the housing and divides the interior volume into a first chamber and a second chamber. The diaphragm flexes in response to pressure differentials in the first and second chambers. The inner conductor is disposed in the first chamber. The outer conductor is disposed in the first chamber around the inner conductor. The first baffle is disposed in the second chamber and defines an inner region, a middle region, and an outer region. The inner region underlies the inner conductor. The middle region underlies the outer conductor. The outer region underlies neither the inner conductor nor the outer conductor. The first baffle defines apertures in at least two of the inner, middle, and outer regions.

22 Claims, 6 Drawing Sheets

US 6,993,973 B2
Page 2

U.S. PATENT DOCUMENTS

| | | |
|---|---|---|
| 2,753,515 A | 7/1956 | Rickner |
| 2,755,419 A | 7/1956 | Hollmann |
| 2,907,320 A | 10/1959 | Weese et al. |
| 2,999,386 A | 9/1961 | Wolfe |
| 3,000,215 A | 9/1961 | Atanasoff et al. |
| 3,113,456 A | 12/1963 | Slater |
| 3,243,998 A | 4/1966 | Vosteen |
| 3,318,153 A | 5/1967 | Lode |
| 3,354,721 A | 11/1967 | Fiske |
| 3,371,537 A | 3/1968 | Kiene |
| 3,619,742 A | 11/1971 | Rud Jr. |
| 3,620,083 A | 11/1971 | Dimeff et al. |
| 3,675,072 A | 7/1972 | Hahn et al. |
| 3,858,097 A | 12/1974 | Polye |
| 3,952,234 A | 4/1976 | Birchall |
| 3,968,695 A | 7/1976 | Weiss et al. |
| 4,008,619 A | 2/1977 | Alcaide et al. |
| 4,020,674 A | 5/1977 | Fechter et al. |
| 4,084,438 A | 4/1978 | Lee et al. |
| 4,120,206 A | 10/1978 | Rud, Jr. |
| 4,136,603 A | 1/1979 | Doyle, Jr. |
| 4,168,517 A | 9/1979 | Lee |
| 4,168,518 A | 9/1979 | Lee |
| 4,176,557 A | 12/1979 | Johnston |
| 4,229,776 A | 10/1980 | Antikainen et al. |
| 4,322,775 A | 3/1982 | Delatorre |
| 4,357,834 A | 11/1982 | Hokushin |
| 4,358,814 A | 11/1982 | Lee et al. |
| 4,422,125 A | 12/1983 | Antonazzi et al. |
| 4,424,713 A | 1/1984 | Kroninger, Jr. et al. |
| 4,425,799 A | 1/1984 | Park |
| 4,426,673 A | 1/1984 | Bell et al. |
| 4,433,580 A | 2/1984 | Tward |
| 4,434,203 A | 2/1984 | Briefer |
| 4,458,537 A | 7/1984 | Bell et al. |
| 4,464,725 A | 8/1984 | Briefer |
| 4,495,820 A | 1/1985 | Shimada et al. |
| 4,499,773 A | 2/1985 | Dresser |
| 4,542,436 A | 9/1985 | Carusillo |
| 4,562,742 A * | 1/1986 | Bell ........................... 73/718 |
| 4,567,773 A | 2/1986 | Cooper et al. |
| 4,572,204 A | 2/1986 | Kimura |
| 4,587,851 A | 5/1986 | Mortberg |
| 4,598,381 A | 7/1986 | Cucci |
| 4,603,371 A | 7/1986 | Frick |
| 4,628,403 A | 12/1986 | Kuisma |
| 4,670,733 A | 6/1987 | Bell |
| 4,679,643 A | 7/1987 | Bové |
| 4,691,574 A | 9/1987 | Delatorre |
| 4,714,464 A | 12/1987 | Newton |
| 4,733,875 A | 3/1988 | Azuma et al. |
| 4,735,090 A | 4/1988 | Jeffrey et al. |
| 4,735,098 A | 4/1988 | Kavli et al. |
| 4,748,861 A | 6/1988 | Matsumoto et al. |
| 4,769,738 A | 9/1988 | Nakamura et al. |
| 4,774,626 A | 9/1988 | Charboneau et al. |
| 4,785,669 A | 11/1988 | Benson et al. |
| 4,807,477 A | 2/1989 | Myers et al. |
| 4,815,324 A | 3/1989 | Tada et al. |
| 4,823,603 A | 4/1989 | Ferran et al. |
| 4,831,492 A | 5/1989 | Kuisma |
| 4,850,227 A | 7/1989 | Luettgen et al. |
| 4,851,015 A | 7/1989 | Wagner et al. |
| 4,920,805 A | 5/1990 | Yajima et al. |
| 4,935,841 A | 6/1990 | Jonsson et al. |
| 4,944,187 A | 7/1990 | Frick et al. |
| 4,977,480 A | 12/1990 | Nishihara |
| 5,001,595 A | 3/1991 | Dittrich et al. |
| 5,005,421 A | 4/1991 | Hegner et al. |
| 5,020,377 A | 6/1991 | Park |
| 5,050,034 A | 9/1991 | Hegner et al. |
| 5,150,275 A | 9/1992 | Lee et al. |
| 5,155,653 A | 10/1992 | Kremidas |
| 5,165,281 A | 11/1992 | Bell |
| 5,189,591 A | 2/1993 | Bernot |
| 5,249,469 A | 10/1993 | Jonsson et al. |
| 5,271,277 A * | 12/1993 | Pandorf ....................... 73/724 |
| 5,275,055 A | 1/1994 | Zook et al. |
| 5,279,163 A | 1/1994 | D'Antonio et al. |
| 5,291,534 A | 3/1994 | Sakurai et al. |
| 5,311,140 A | 5/1994 | Permuy |
| 5,315,877 A | 5/1994 | Park et al. |
| 5,333,637 A | 8/1994 | Gravel |
| 5,348,568 A | 9/1994 | Oda et al. |
| 5,349,492 A | 9/1994 | Kimura et al. |
| 5,349,637 A | 9/1994 | Miller |
| 5,351,548 A | 10/1994 | Briggs et al. |
| 5,351,938 A | 10/1994 | Hegner et al. |
| 5,369,228 A | 11/1994 | Faust |
| 5,400,489 A | 3/1995 | Hegner et al. |
| 5,442,962 A * | 8/1995 | Lee ........................... 73/718 |
| 5,485,345 A | 1/1996 | Lukasiewicz et al. |
| 5,497,620 A | 3/1996 | Stobbe |
| 5,499,158 A | 3/1996 | Bishop et al. |
| 5,499,533 A | 3/1996 | Miller et al. |
| 5,539,611 A | 7/1996 | Hegner et al. |
| 5,541,561 A | 7/1996 | Grunert et al. |
| 5,542,300 A | 8/1996 | Lee |
| 5,561,247 A | 10/1996 | Mutoh et al. |
| 5,571,970 A | 11/1996 | Mutoh et al. |
| 5,603,684 A | 2/1997 | Wetmore et al. |
| 5,604,315 A | 2/1997 | Briefer et al. |
| 5,625,152 A | 4/1997 | Pandorf et al. |
| 5,756,899 A | 5/1998 | Ugai et al. |
| 5,808,206 A | 9/1998 | Pandorf et al. |
| 5,811,685 A * | 9/1998 | Grudzien, Jr. ................ 73/724 |
| 5,836,063 A | 11/1998 | Hegner et al. |
| 5,911,162 A * | 6/1999 | Denner ........................ 73/718 |
| 5,920,015 A | 7/1999 | Hallberg et al. |
| 5,925,824 A | 7/1999 | Soma et al. |
| 5,932,332 A | 8/1999 | Pandorf et al. |
| 5,939,639 A | 8/1999 | Lethbridge |
| 5,948,169 A | 9/1999 | Wu |
| 5,965,821 A | 10/1999 | Grudzien |
| 6,029,524 A | 2/2000 | Klauder et al. |
| 6,029,525 A | 2/2000 | Grudzien |
| 6,105,436 A | 8/2000 | Lishcer et al. |
| 6,105,437 A | 8/2000 | Klug et al. |
| 6,112,597 A | 9/2000 | Tschope |
| 6,119,524 A | 9/2000 | Kobold |
| 6,122,976 A | 9/2000 | Hallberg et al. |
| 6,209,398 B1 | 4/2001 | Fowler et al. |
| 6,315,734 B1 | 11/2001 | Nunome |
| 6,340,929 B1 | 1/2002 | Katou et al. |
| 6,423,949 B1 | 7/2002 | Chen et al. |
| 6,439,056 B1 | 8/2002 | Jonsson |
| 6,443,015 B1 | 9/2002 | Poulin et al. |
| 6,451,159 B1 | 9/2002 | Lam |
| 6,568,274 B1 | 5/2003 | Lucas et al. |
| 6,581,471 B1 | 7/2003 | Quigley et al. |
| 6,588,280 B1 | 7/2003 | Quigley et al. |
| 6,612,176 B2 | 9/2003 | Poulin et al. |
| 6,772,640 B1 | 9/2003 | Poulin et al. |
| 6,735,845 B2 | 5/2004 | Traverso |
| 2002/0026835 A1 | 3/2002 | Jacob et al. |
| 2003/0167852 A1 * | 9/2003 | Traverso ..................... 73/756 |

FOREIGN PATENT DOCUMENTS

| | | |
|---|---|---|
| EP | 0 473 109 A2 | 3/1992 |
| EP | 549 229 A2 | 6/1993 |
| FR | 895938 | 2/1945 |

| | | |
|---|---|---|
| GB | 1 497 212 A | 1/1978 |
| JP | 56-16026 | 12/1981 |
| JP | 5-172675 | 7/1993 |
| WO | WO 99/01731 | 1/1990 |
| WO | WO 95/06236 | 3/1995 |
| WO | WO 95/28624 | 10/1995 |
| WO | WO 98/59228 | 12/1998 |
| WO | WO 99/32866 | 7/1999 |
| WO | WO 99/40405 | 8/1999 |
| WO | WO 00/43745 | 7/2000 |
| WO | WO 01/18516 A1 | 3/2001 |
| WO | WO 01/25740 | 4/2001 |
| WO | WO 02/31458 A3 | 4/2002 |
| WO | WO 02/054034 A1 | 7/2002 |
| WO | WO 03/056289 | 7/2003 |
| WO | WO 03/078952 A2 | 9/2003 |
| WO | WO 03/089891 A1 | 10/2003 |

OTHER PUBLICATIONS

Cook, D. B. et al., "A Simple Diaphragm micromanometer," 1953, J. Scientific Instruments, vol. 30, pp. 238–239.

Instrument Specialities, Product Design & Shielding Selection Guide, "Fabricated UltraFlex Gaskets,", p. 108.

Tecknit, EMI Shield Products, "Custom Strips, " p. A–3.

* cited by examiner

CONTAMINANT DEPOSITION CONTROL BAFFLE FOR A CAPACITIVE PRESSURE TRANSDUCER

BACKGROUND OF THE INVENTION

The present invention is related to capacitive pressure transducers. More particularly, the present invention relates to controlling deposition of contaminants in capacitive pressure transducers.

Figure 1A:
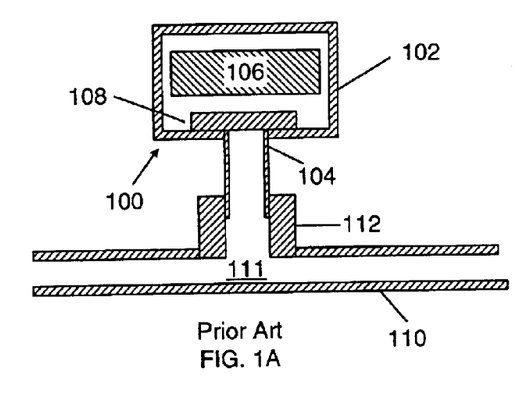
FIG. 1A is a sectional side view of a prior art capacitive pressure transducer.

FIG. 1A shows a sectional side view of a prior art capacitive pressure transducer 100. For convenience of illustration, FIG. 1A, as well as other figures in the present disclosure, are not drawn to scale. As shown, transducer 100 includes a housing 102, a capacitive pressure sensor 106 disposed within housing 102, an inlet tube 104, and a filtering mechanism 108. For convenience of illustration, many details of transducer 100 are omitted from FIG. 1A. However, such sensors are well known and are described, for example, in U.S. Pat. Nos. 5,911,162 and 6,105,436 and U.S. patent application Ser. Nos. 09/394,804 and 09/637,980.

Briefly, transducer 100 is normally coupled to a gas line 110, or some other external source of gas or fluid 11 by a coupling 112. In operation, sensor 106 generates an output signal representative of the pressure of gas 111 (i.e., the pressure within external source 110).

Pressure transducers such as transducer 100 are often used in integrated circuit fabrication foundries, for example, to measure the pressure of a fluid in a gas line that is being delivered to a deposition chamber, or to measure the pressure within the deposition chamber itself. Some of the processes used in integrated circuit fabrication, such as the etching of aluminum, tend to generate a large volume of particles or contaminants. It is generally desirable to prevent such contaminants from entering the sensor 106. When contaminants do enter, or become built up in, sensor 106, the accuracy of the pressure measurement provided by transducer 100 is adversely affected. Accordingly, prior art pressure transducers have used a variety of mechanisms to prevent contaminants from reaching the sensor 106. Such prior art filtering mechanisms are generally disposed between the inlet tube 104 and the sensor 106, and are indicated generally in FIG. 1A at 108.

Figure 1B:
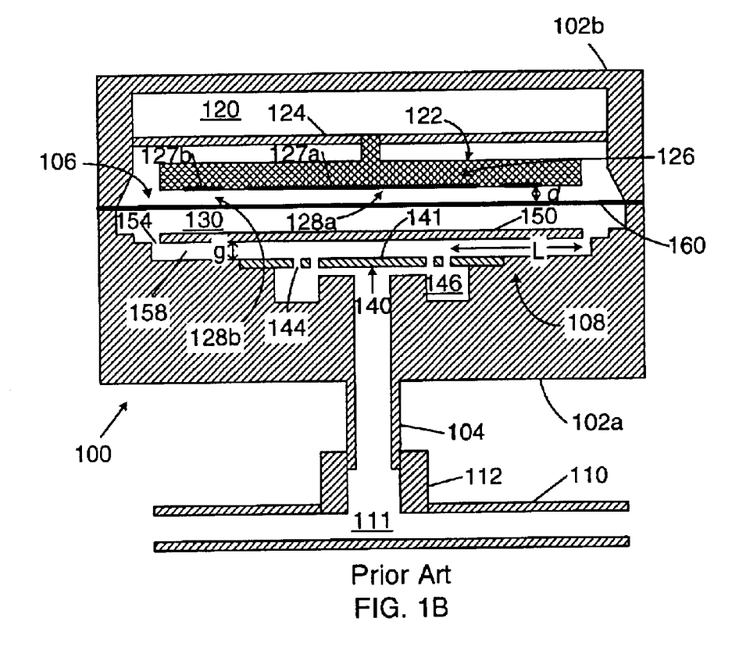
FIG. 1B is a more detailed sectional side view of a prior art capacitive pressure transducer.

FIG. 1B shows a more detailed view of a particular prior art pressure transducer 100 showing both the sensor 106 (which as discussed below includes elements 127a, 127b, and 160) and the filtration mechanisms 108 (which as discussed below includes elements 140, 150). Transducer 100 includes a lower housing 102a and an upper housing 102b, which are separated by a relatively thin, flexible conductive diaphragm 160. Lower and upper housings 102a, 102b, and diaphragm 160 are normally welded together. Upper housing 102b and diaphragm 160 define a sealed interior chamber 120. Lower housing 102a and diaphragm 160 define an interior chamber 130 that opens into inlet tube 104. Diaphragm 160 is mounted so that it flexes, or deflects, in response to pressure differentials in chambers 120, 130.

Figure 1C:
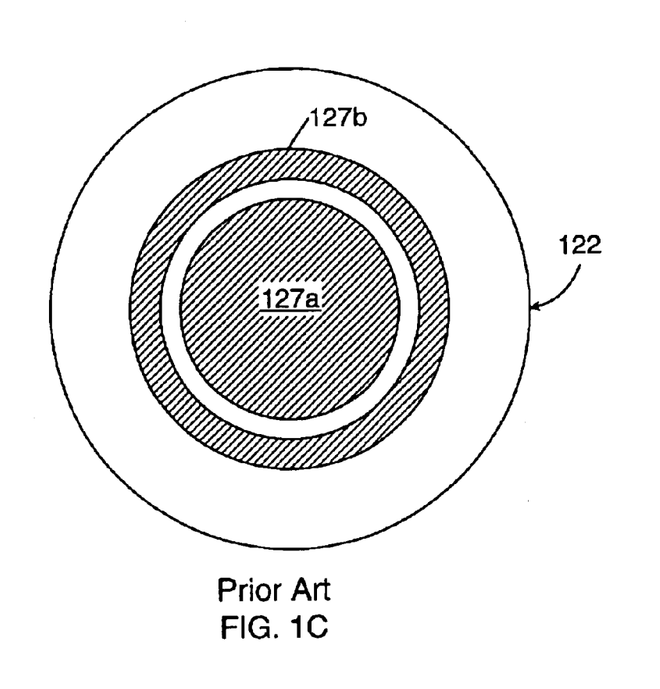
FIG. 1C shows the pattern of conductors deposited onto the bottom of the electrode shown in FIG. 1B.

Transducer 100 includes a ceramic electrode 122 disposed within chamber 120. Electrode 122 is supported within chamber 120 by a support 124. An inner conductor 127a and an outer conductor 127b are disposed on the bottom of electrode 122. FIG. 1C shows a bottom view of electrode 122 showing the geometries of the inner and outer conductors 127a, 127b. As shown, inner conductor 127a is circular. Outer conductor 127b is annular and surrounds inner conductor 127a. The area of inner conductor 127a is normally selected to be equal to the area of outer conductor 127b. Conductors 127a, 127b are generally parallel to and spaced apart from diaphragm 160. Diaphragm 160 and the conductors 127a, 127b form two variable capacitors 128a, 128b. More particularly, diaphragm 160 and inner conductor 127a form a variable inner capacitor 128a, which is characterized by an inner capacitance $C_{inner}$. Similarly, diaphragm 160 and outer conductor 127b form a variable outer capacitor 128b, which is characterized by an outer capacitance $C_{outer}$.

The capacitance of each of the variable capacitors is determined, in part, by the distance d between the diaphragm and the relevant conductor. More specifically, as is well known, $C = A e_r e_0 / d$, where C is the capacitance between two parallel conductive plates, A is the common area between the plates, $e_0$ is the permittivity of a vacuum, $e_r$ is the relative permittivity of the material separating the plates ($e_r=1$ for vacuum), and d is the axial distance between the plates (i.e., the distance between the plates measured along an axis normal to the plates).

As diaphragm 160 flexes in response to changes in the differential pressure between chambers 120, 130, the capacitances of the variable capacitors 128a, 128b change and thereby provide an indication of the differential pressure.

A reference pressure, which may be near vacuum, is normally provided in chamber 120, inlet tube 104 is connected via coupling 112 to a gas line 110 containing gas 111, and transducer 100 provides an electrical output signal indicative of the pressure of gas 111. In other configurations, a second inlet tube leading into chamber 120 may be provided and connected to a second external source. In such configurations, transducer 100 provides a signal indicative of the differential pressure between the two external sources. Transducers will be discussed herein in the context of measuring the pressure of gas or fluid 111, but it will be appreciated that they can also be used as differential pressure transducers.

A capacitive pressure transducer can be built using only a single conductor and a single variable capacitor. However, the output signals generated by such transducers have the undesirable characteristic of varying in response to "planar shifts" of the diaphragm. Such planar shifts can be caused by factors independent of the pressure of gas 111, such as temperature variations in the ambient environment of the transducer. Different rates of thermal expansion in different parts of the transducer can cause changes in the distance between the diaphragm and the electrode. As is well known, the accuracy and stability of a transducer may be improved by including two variable capacitors in the transducer and by generating the transducer's output signal according to a function of the difference of the two capacitors (e.g., a function of $C_{inner}$ minus $C_{outer}$). When the pressure of gas 111 increases, diaphragm 160 flexes, or bows, so that the central portion of diaphragm 160 moves closer to electrode 122 than do the outer portions of the diaphragm. This causes both the inner and outer capacitances to change, but the inner capacitance changes by a greater amount. The delta between the inner and outer capacitances gives a good indication of the pressure of gas 111. However, if the entire diaphragm 160 moves in a direction normal to the diaphragm, either closer to, or further away from, electrode 122 (i.e., if the diaphragm 160 experiences a "planar shift"), the inner and outer capacitance will change by the same amount (as long as the areas of the inner and outer conductors are equal), and the output signal (which is based in the difference between the two capacitances) will be unaffected. Thus, including two variable capacitors can advantageously render the transducer insensitive to planar shifts of the diaphragm.

As noted above, contaminants (e.g., produced by etching aluminum) are often contained in the gas 111. When such contaminants become deposited on diaphragm 160, they can adversely affect the accuracy of transducer 100. The most common problem caused by contaminant deposition is generally referred to as a "zero shift". The output signal generated by transducer 100 generally lies in a range between some minimum and maximum values. For example, one popular choice is for the transducer's output signal to be an analog signal that ranges between zero and ten volts, zero volts representing the minimum limit of pressure detectable by the transducer, ten volts representing the maximum pressure detectable by the transducer, and the signal varying linearly with pressure between zero and ten volts. Electronics (not shown), normally disposed in the transducer outside of chambers 120, 130, normally generate this output signal. When a transducer experiences a zero shift, it will no longer generate an output signal equal to zero volts when the pressure of gas 111 is at the minimum limit of detectable pressure. Rather, when the gas pressure is at this minimum limit, the transducer will generate a non-zero output signal. In an effort to reduce zero shifts and other problems caused by contaminant deposition, prior art transducers have used a variety of filters to prevent contaminants from becoming deposited on diaphragm 160.

Figure 2:
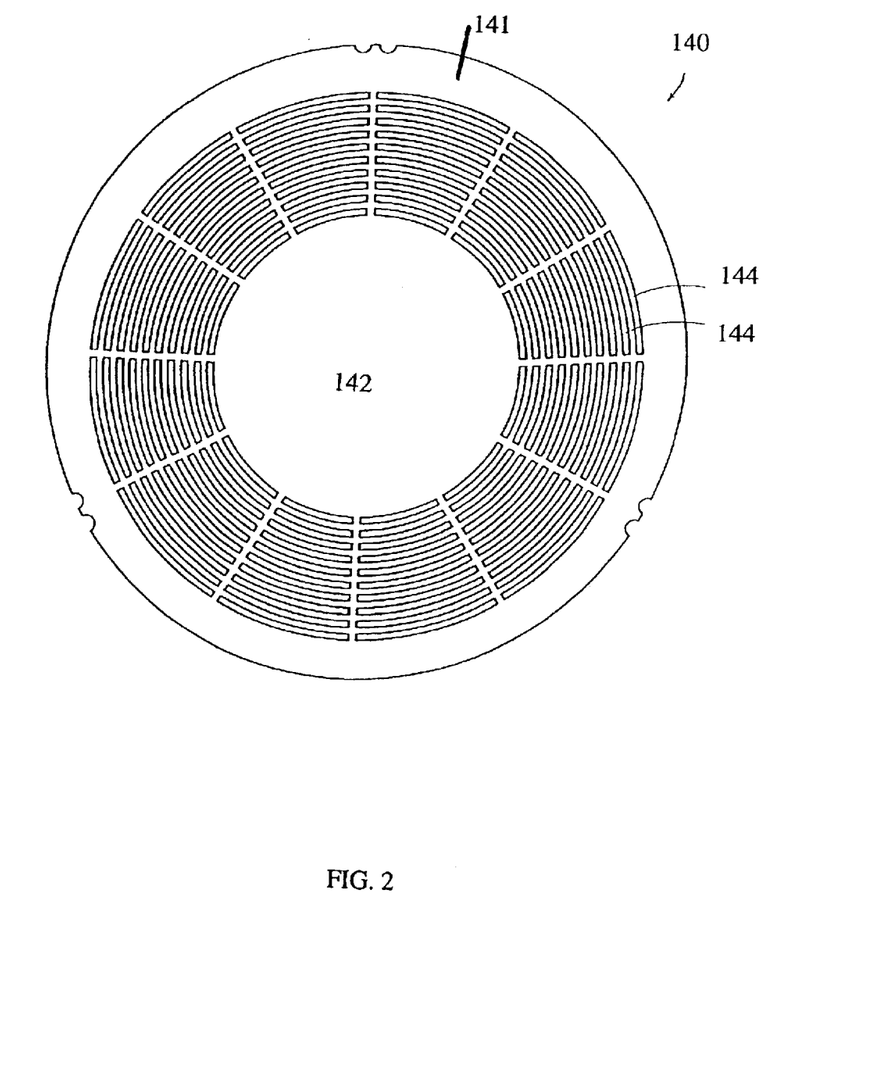
FIG. 2 is a top view of the prior art baffle of the trap system shown in FIG. 1B.

In the illustrated transducer 100, the contaminant filtration mechanisms 108 include a particle trap system 140 and a baffle 150. Trap system 140 includes a baffle 141, a top view of which is shown in FIG. 2. Baffle 141 includes a central, circular, closed portion 142 and an annular region, defining a plurality of openings 144, disposed around closed portion 142. Openings 144 are formed as series of sectors evenly spaced about the baffle 141 in a circumferential direction, and are also arranged at different diameters radially. The diameter of central portion 142 is greater than that of inlet tube 104 and thereby blocks any direct paths from inlet tube 104 to the diaphragm 160. So, any contaminant in inlet tube 104 can not follow a straight line path all the way to diaphragm 160 and must instead, after traveling the length of inlet tube 104, then travel in a direction generally perpendicular to the length of inlet tube 104 (the perpendicular direction being generally illustrated in FIG. 1B by the arrow L), enter an annular chamber region 146, and then pass through one of the peripheral openings 144. The peripheral openings 144 are sized to prevent relatively large particles (e.g., 250 microns and larger) from passing through the openings. Trap system 140 also includes the chamber 146, which is defined between baffle 141 and housing member 102*a*. Particles that can't pass through openings 144 tend to accumulate in, or become trapped in, chamber 146.

Figure 3:
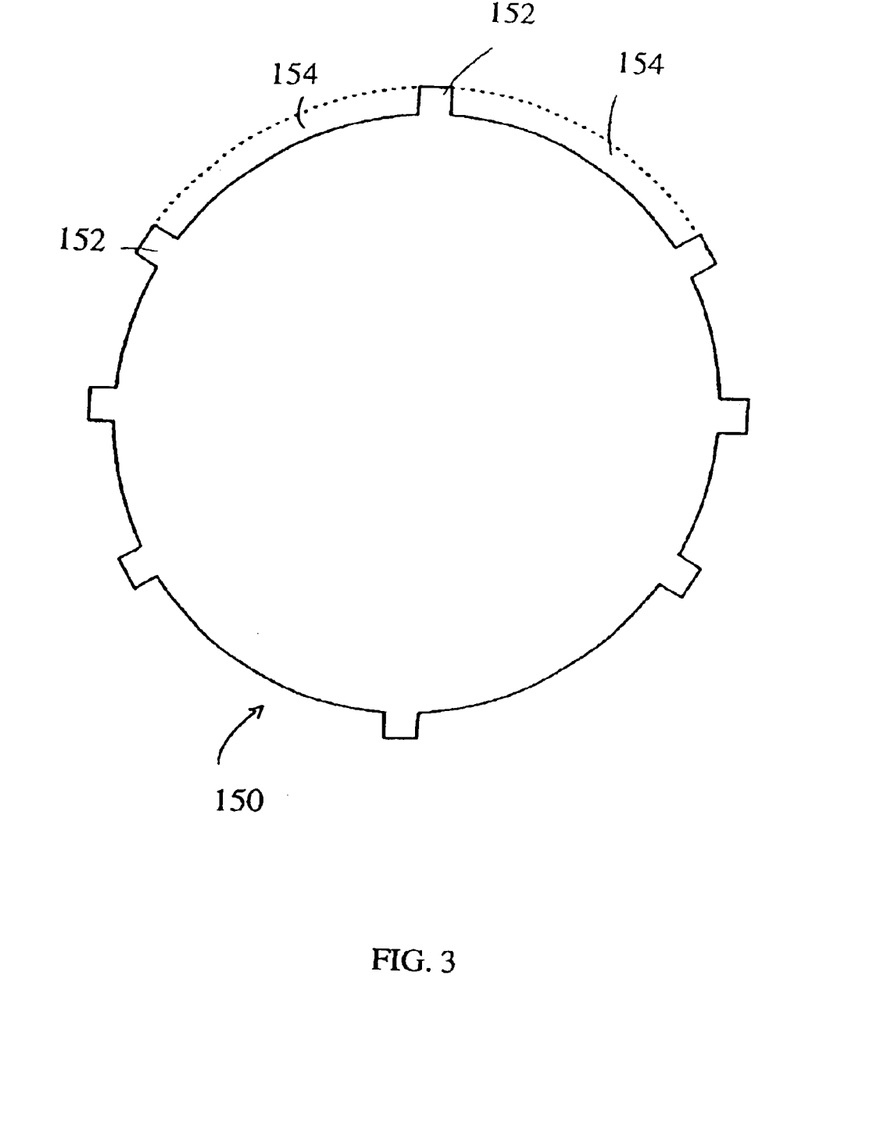
FIG. 3 is a top view of the baffle of the transducer show in FIG. 1B.

As noted above, transducer 100 also includes a baffle 150 to further reduce the number of contaminants that can reach the diaphragm 160. Baffle 150 is described in U.S. Pat. No. 6,443,015. FIG. 3 shows a top view of baffle 150. As shown, baffle 150 is essentially a circular metal plate with a plurality of evenly spaced tabs 152 disposed about the circumference. Housing member 102*a* has stepped regions that come in contact with tabs 152 so as to support baffle 150 in the position shown in FIG. 1B.

Tabs 152 essentially define a plurality of annular sectors 154 (shown in FIGS. 1B and 3) having a width in the radial direction between the peripheral edge of baffle 150 and housing member 102*a* that is determined by the length of the tabs. Baffle 150 and housing member 102*a* define a region 158 through which any contaminant must flow if it is to travel from inlet tube 104 to diaphragm 160. The region 158 is annular and is bounded above by baffle 150 and below by either baffle 141 or lower housing member 102*a* (where the terms "above" and "below" are with reference to FIG. 1B, but do not imply any absolute orientation of transducer 100). Contaminants may enter region 158 via the peripheral openings 144 and may exit region 158 via the annular sectors 154 (shown in FIGS. 1B and 3) between the peripheral edge of baffle 150 and housing member 102*a*.

Region 158 is characterized by a length L and a gap g. The length L of region 158 (shown in FIG. 1B) is the distance between openings 144 to annular sectors 154. The gap g of region 154 is the distance between baffle 150 and housing member 102*a*. The aspect ratio of region 158 is defined as the ratio of the length L to the gap g. As taught in U.S. Pat. No. 6,443,015, the aspect ratio is preferably greater than 10. The length L is preferably at least 1 cm, and preferably in the range of about 1–4 cm; the gap g is preferably no more than about 0.1 cm, and preferably in a range of about 0.025–0.1 cm.

When the pressure in chamber 130 is relatively low (e.g., less than 0.02 Toff), movement of material in chamber 130 is characterized by "molecular flow". In molecular flow, molecules in chamber 130 generally travel in straight line paths until colliding with a solid surface of the transducer. This stands in contrast to behavior in denser gasses in which molecules are unlikely to travel in straight line paths from one surface of the transducer to another and are instead far more likely to rebound off of each other. Under molecular flow conditions, any contaminant traveling through region 158 will likely collide with the surfaces of baffle 150 and housing member 102*a* many times prior to reaching, and passing through, an annular sector 154. The probability that a contaminant particle will become deposited on, or stuck to, a surface of baffle 150 or housing member 102*a* rather than continuing on through region 158 and passing through an annular sector 154 is an increasing function of the number of collisions the contaminant makes with the surfaces of baffle 150 and housing member 102*a*. Selecting the aspect ratio of the length L to the gap g to be greater than 10 ensures that any contaminant traveling through region 158 is likely to become deposited on a surface of either baffle 150 or housing member 102*a* rather than continuing on through region 158, passing through an annular sector 154, and ultimately reaching the diaphragm 160.

The use of trap system 140 and baffle 150 has been effective at greatly reducing the number of contaminants that reach the diaphragm 160 and in reducing corresponding zero shifts. However, it would nonetheless be advantageous to provide improved control over deposition of contaminants on the diaphragm of a capacitive pressure transducer.

SUMMARY OF THE INVENTION

Prior art filtration techniques attempted to prevent, or reduce as much as possible, contaminants from reaching the diaphragm of capacitive pressure transducers. The present invention provides an alternate approach. Instead of eliminating contaminants, a baffle constructed according to the invention steers contaminants to the diaphragm in an predetermined pattern so as to minimize the effect that such contaminants can have on performance of the transducer.

In a transducer with two variable capacitors, contaminants that settle on the diaphragm near a particular conductor, tend to affect the capacitance of that conductor's associated variable capacitor more than that of the other variable capacitor. Transducers generally generate an output signal according to a function of the difference between the capacitances of two variable capacitors. The effect that contaminants have on the output signal can therefore be minimized by assuring that the contaminants have an equal, or nearly equal, effect on both of the variable capacitors. Baffles constructed according to the invention provide control over where on the diaphragm contaminants may settle and can be configured, for example, to ensure that the amount of contaminants settling on the diaphragm near one conductor are about equal to the amount of contaminants settling on the diaphragm near the other conductor.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

DETAILED DESCRIPTION OF THE PREFERRED EMBODIMENTS

Figure 4A:
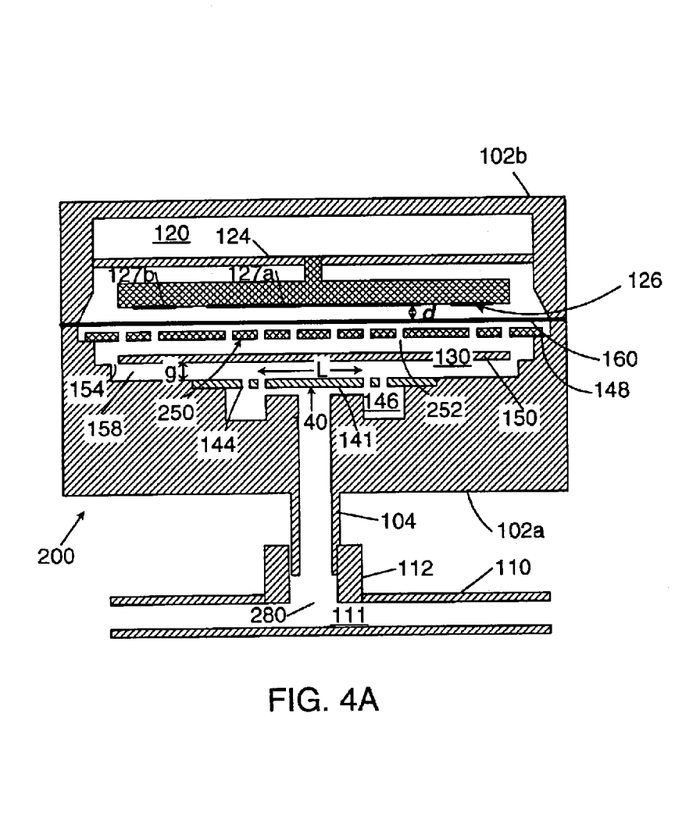
FIG. 4A is a sectional side view of a capacitive pressure transducer constructed in accordance with the present invention.

FIG. 4A shows a sectional side view of a capacitive pressure transducer 200 constructed according to the present invention. In addition to the components shown (in FIG. 1B) in prior art pressure transducer 100, transducer 200 also contains a deposition controlling baffle 250 disposed in internal chamber 130 between diaphragm 160 and baffle 150. Material (e.g., gas molecules or particle contaminants) entering pressure transducer 200 enters through gas line 110 and passes through trap system 140, baffle 150, and finally through deposition controlling baffle 250 before contacting diaphragm 160. As will be further explained below, baffle 250 redirects the flow of contaminants within chamber 130 so as to control zero shifts within pressure transducer 200.

Figure 4B:
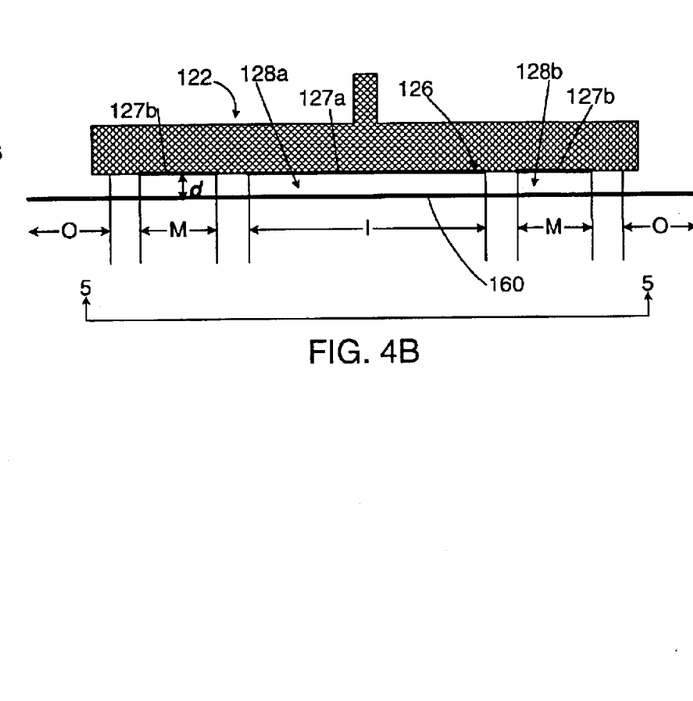
FIG. 4B is an expanded sectional side view of the electrode and diaphragm of the transducer shown in FIG. 4A.

FIG. 4B shows an expanded view of a portion of transducer 200. More specifically, FIG. 4B shows an expanded sectional side view of electrode 122 and diaphragm 160. As shown, diaphragm 160 may be thought of as being segmented into three different regions based on proximity to the inner conductor 127a and the outer conductor 127b. An inner region I of diaphragm 160 is proximal to the inner conductor 127a. A middle region M of diaphragm 160 is proximal to outer conductor 127b. Finally, an outer region O of diaphragm 160 lies outside of the outer conductor 127b. There is some flexibility in defining the extent of regions I, M, and O. In FIG. 4B, the boundaries of the inner and middle regions I, M are determined by lines extending from the edges of the conductors in a direction normal to the conductors. Alternatively, regions I and M could be described as "underlying", the inner and outer conductors, respectively, and region C could be described as extending around and not underlying the outer conductor (the word "underlying" being with reference to the orientation shown in FIGS. 4A and 4B and not implying any absolute orientation of the transducer). However, it will be appreciated that the regions need not be defined with such precision. The inner and middle regions I, M may be thought of as simply being proximal to the inner and outer conductors, respectively, and outer region O may be thought of as lying outside of middle region M. Outer region O may alternatively be thought of as lying outside the "active area" of the diaphragm since this region of the diaphragm does not contribute principally to the capacitance of the inner and outer capacitors.

Deposition of contaminants in inner region I tends to affect the capacitance of the inner capacitor 128a (i.e., the capacitor defined by diaphragm 160 and the inner conductor 127a). Deposition of contaminants in middle region M tends to affect the capacitance of the outer capacitor 128b (i.e., the capacitor defined by diaphragm 160 and the outer conductor 127b). Deposition of contaminants in outer region O does not significantly affect the capacitance of either of the variable capacitors 128a, 128b. Contaminant deposition in inner region I may either increase or decrease the capacitance of inner capacitor 128a. Similarly, contaminant deposition in the middle region M may either increase or decrease the capacitance of outer capacitor 128b. Whether contaminant deposition increases or decreases the capacitance of the relevant variable capacitor depends on factors such as surface tension in the deposited contaminant layer, composition of the contaminants, etc. Some processes, such as etching of aluminum, may cause contaminant deposition that increases capacitance. Other processes tend to cause contaminant deposition that decreases capacitance. Unless explicitly specified, the discussion below will assume that the contaminants are of the variety that cause increases in capacitance.

Returning to FIG. 1B, when prior art transducer 100 is operated in contaminant rich environments, baffle 150 tends to ensure that most contaminants that reach, and become deposited on, diaphragm 160, are deposited in outer region O of the diaphragm. Contaminants deposited in outer region O (or outside the active region) do not affect the capacitance of the variable capacitors as much as contaminant deposition in regions I and M. However, over time baffle 150 permits sufficient contaminants to reach middle region M so as to increase the capacitance of the outer capacitor 128b. When this occurs, the transducer 100 experiences: a "negative zero shift". Since the transducer's output signal is generated according to a function of the inner capacitance minus the outer capacitance, an artificially caused increase of the outer capacitor (i.e., an increase caused by factors other than pressure variations in gas 111 such as contaminant deposition) tends to reduce the value of the output signal generated by transducer 100 in response to any given gas pressure. When the pressure of gas 111 is at the minimum limit measurable by transducer 100, and when the output signal generated by transducer 100 should be zero volts, a contaminant induced increase in the outer capacitance causes transducer 100 to generate an output signal that is below zero volts, or an output signal that is "negative zero shifted".

Negative zero shifts represent a potentially serious problem for many users of transducer 100. Transducer 100 normally generates an analog output signal representative of the pressure of gas 111. The analog output signal can generally assume values below the expected minimum value (e.g., it can assume negative values when zero volts is the expected minimum value), and it can also assume values above the expected maximum value. However, many users of transducer 100 read the transducer's output signal via an analog-to-digital converter that is incapable of producing output values below an expected minimum. For example, if the expected minimum value for the output signal is zero volts, many analog-to-digital converters will translate a negative analog output signal (i.e., a signal below zero volts) into a digital zero, thus rendering a negative zero shift invisible, or undetectable.

As noted above, in transducer 200, baffle 250 redirects the flow of contaminants within chamber 130 so as to control zero shifts within pressure transducer 200. Baffle 250 tends to eliminate zero shifts, and to the extent that zero shifts occur, baffle 250 tends to ensure that the zero shifts are "positive zero shifts" instead of "negative zero shifts". Since positive zero shifts (e.g., shifts in which the transducer's output signal is above an expected minimum value when the pressure of gas 111 is at the minimum detectable limit) are generally more easily detectable by users of transducer 100, and can be dealt with by recalibration, it is advantageous to ensure that any zero shifts occurring in transducer 200 are positive rather than negative.

Figure 5:
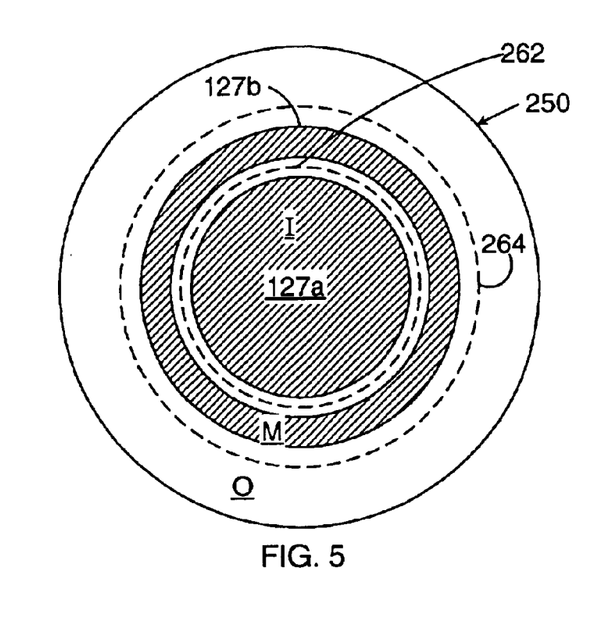
FIG. 5 shows a baffle constructed according to the invention aligned with the conductors on the electrode.

FIG. 5 shows a view of deposition controlling baffle 250 aligned with the inner and outer conductors 127a, 127b taken in the direction of arrow 5—5 as shown in FIG. 4B. For convenience of illustration, diaphragm 160, which is disposed between baffle 250 and the inner and outer conductors 127a, 127b, is not shown in FIG. 5. As shown, deposition controlling baffle 250 is divided up into three regions: an inner region I, and middle region M, and an outer region O. The inner region I of baffle 250 lies inside dashed circle 262. The middle region M of baffle 250 lies between dashed circles 264 and 262. The outer region O of baffle 250 lies outside of dashed circle 264. Apertures (not shown in FIG. 5) are provided in the inner region I, the middle region M, and the outer region O of baffle 250.

The baffle 250 is disposed proximal to diaphragm 160 such that: (a) the majority of contaminants passing through apertures in the inner region I of baffle 250 tend to deposit on the inner region I of the diaphragm; (b) the majority of contaminants passing through apertures in the middle region M of baffle 250 tend to deposit on the middle region M of the diaphragm; and (c) the majority of contaminants passing through apertures in the outer region O of the baffle 250 tend to deposit on the outer region O of the diaphragm. Due to the random motion of particles in a gas (even a low pressure gas characterized by molecular flow), some contaminants passing through apertures in the inner region I of the baffle 250 will become deposited on the diaphragm outside of the inner region I. Similarly, some of the contaminants passing through the middle region M and the outer region O of baffle 250 will become deposited on the diaphragm 160 outside of the middle region M and the outer region O, respectively, of the diaphragm 160. However, since the majority of particles passing through any particular region of baffle 250 become deposited in a corresponding region of the diaphragm, baffle 250 provides control over the location of contaminant deposition as contaminants accumulate on the diaphragm.

Prior art filtration techniques attempted to prevent all, or as many as possible, contaminants from reaching the diaphragm 160. Deposition controlling baffle 250 uses a different strategy. Instead of relying on eliminating or trapping contaminants, deposition controlling baffle 250 instead controls where on the diaphragm contaminants will become deposited. Deposition controlling baffle 250 provides a degree of control not previously available in the prior art.

The apertures of deposition controlling baffle 250 may be arranged in a variety of patterns to achieve desired affects. For example, in one configuration, the total area of all the apertures in the inner region I of baffle 250 is selected to be exactly equal to the total area of all the apertures in the middle region M of baffle 250. In theory, such a selection of aperture areas (and the corresponding balancing of contaminant deposition) will prevent the transducer 200 from ever experiencing a zero shift. This is so because any increase in the capacitance of the inner capacitor 128a (caused by deposition of contaminants passing through inner region I of the baffle 250) will be exactly matched by a corresponding increase in the capacitance of the outer capacitor 128b (caused by deposition of contaminants passing through middle region M of the baffle).

However, since it may be difficult to achieve a perfect balancing of contaminant deposition, and since positive zero shifts are preferred over negative zero shifts, it is preferable to make the total area of all the apertures in inner region I of the baffle 250 to be slightly larger than the total area of all the apertures in middle region M of the baffle 250. Such a selection of aperture areas tends to minimize zero shifts (since the amount of contaminants that reach inner region I of the diaphragm will be roughly equal to the amount of contaminants that reach middle region M of the diaphragm), but also ensures that any zero shifts that do occur will be positive rather than negative (i.e., because the amount of contaminants reaching inner region I of the diaphragm will be slightly larger than the amount of contaminants reaching middle region M of the diaphragm).

It is also preferable to steer some of the contaminants to outer region O of the diaphragm (where they theoretically have only a minimal effect on zero shifts) by providing apertures in outer region O of the baffle 250. In theory, transducer 200 could avoid zero shifts entirely by providing all the apertures of baffle 250 in outer region O (and thereby steering all contaminants to outer region O of the diaphragm). However, since some of the contaminants passing through outer region O of the baffle 250 will inevitably become deposited in regions of the diaphragm other than the outer region O, such a configuration would be likely to eventually produce a: zero shift. Accordingly, in the most preferred embodiments, apertures are provided in all three regions I, M, and O of baffle 250. In one embodiment, the outer region O contains forty percent of the total area of apertures in the baffle 250, the middle region M contains twenty nine percent of the total area of apertures in the baffle 250, and the inner region I contains the remaining thirty one percent of the total area of apertures in the baffle. It will be appreciated that considerable variation of these numbers is possible. However, it is generally preferred for the total area of apertures in the inner region I to be slightly larger than the total area of apertures in the middle region, and it is further preferred for the outer region O to contain a non-zero portion of the total aperture area. The desired configuration of apertures in deposition controlling baffle 250 may alternately be expressed in terms of the I:M ratio, or the ratio of the total area of apertures in the inner region I of baffle 250 to the total area of apertures in the middle region M of baffle 250. The I:M ratio is preferably nearly equal to one, but slightly greater than one. And again, the outer region O of baffle 250 preferably includes a non-zero portion of the total aperture area in baffle 250.

Figure 6A:
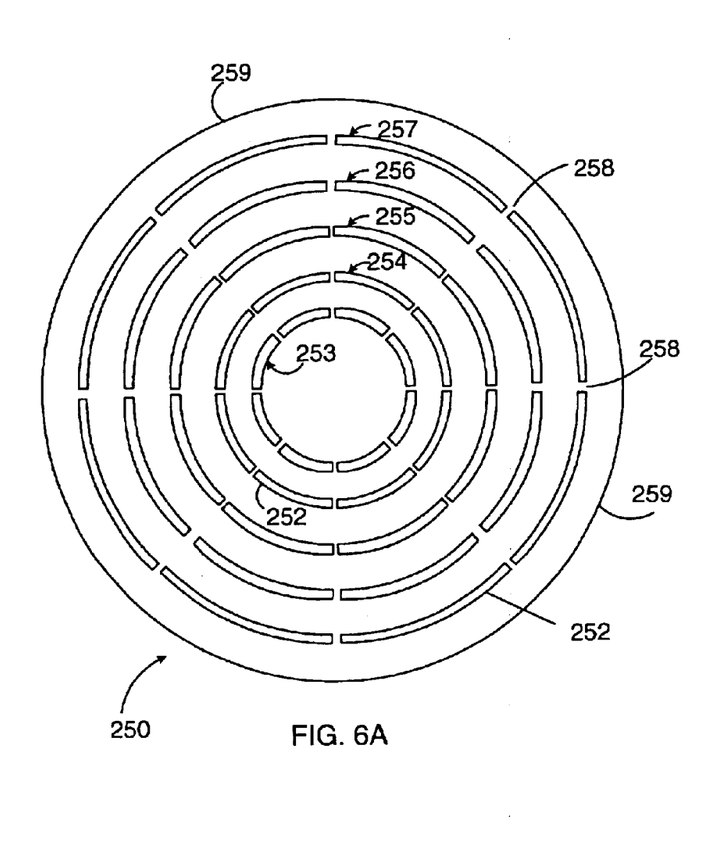
FIG. 6A shows one embodiment of a baffle constructed according to the invention.

FIG. 6A shows a view of one embodiment of deposition controlling baffle 250 taken in the direction of arrow 5—5 as shown in FIG. 4B. In this embodiment, baffle 250 defines a plurality of apertures 252, and the apertures 252 are arranged in five concentric rings 253, 254, 255, 256, 257. The apertures 252 are shaped such that all the apertures 252 in any given ring form a ring-like, or annular perforated area. Adjacent apertures 252 are separated by ribs 258 that extend radially (or spoke like) through baffle 250. The ribs 258 are formed by portions of baffle 250 that have not been perforated to define the apertures 252.

FIG. 6B, which is again taken in the direction of the arrow 5—5 shown in FIG. 4B, shows the alignment of baffle 250 and the inner and outer conductors 127a, 127b, the conductors being shown with cross-hatching. For convenience of illustration, diaphragm 160, which is disposed between baffle 250 and the inner and outer conductors 127a, 127b, is not shown in FIG. 6B. As shown, the three innermost rings 253, 254, 255 underlie the inner conductor 127a; the fourth ring 256 is centered under the outer conductor 127b; and the outermost ring 257 is disposed outside of the outer conductor 127b. Referring again to FIG. 4B, it will be appreciated that most contaminants that pass through rings 253, 254, 255 will become deposited in inner region I of the diaphragm 160; most contaminants that pass through ring 256 will become deposited in middle region M of the diaphragm 160; and most contaminants that pass through ring 257 will become deposited in outer region O of the diaphragm 160.

Deposition controlling baffle 250 is preferably welded to shoulder 148 (shown in FIG. 4A) of lower housing 102a. Baffle 250 may be spot welded at locations 259 (some of which are indicated in FIG. 6A) that are at the outer periphery of baffle 250 and are evenly spaced between adjacent ribs 258. Baffle 250 and housing 102 may be made from the same metal (e.g., Inconel). The gap between baffle 250 and diaphragm 160 may be for example 0.03 centimeters. Baffle 250 is preferably used in combination with baffles 150, 140. However, baffle 250 may also be used as the sole mechanism for controlling contaminant deposition.

Figure 6B:
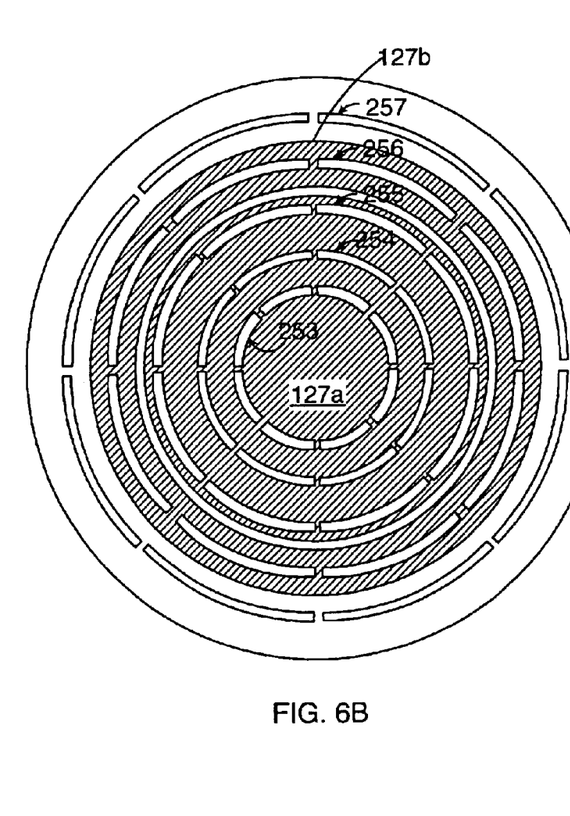
FIG. 6B shows the baffle shown in FIG. 6A aligned with the conductors of a pressure transducer constructed according to the invention.

An alternative to the baffle configuration shown in FIGS. 6A and 6B is to fabricate deposition controlling baffle 250 from a sintered metal element such as the type commercially available from Pall Corporation of East Hills, N.Y. and also from Mott Corporation of Farmington, Conn. Such elements are mesh-like and define a plurality of very small apertures. Also, such elements may be fabricated in disk shapes so as to fit into transducer 200 as shown generally in FIG. 4A at 250. Each unit area of such an element defines substantially the same area of apertures as any other unit area. Since the area of inner conductor 127a is substantially equal to the area of outer conductor 127b, using such a sintered metal element for baffle 250 essentially guarantees that the total area of apertures proximal to (or underlying) inner conductor 127a is substantially equal to the total area of apertures proximal to (or underlying) outer conductor 127b. So, such a baffle again tends to reduce or eliminate zero shifts from the transducer even while allowing contaminants to pass through to the diaphragm.

Since certain changes may be made in the above apparatus without departing from the scope of the invention herein involved, it is intended that all matter contained in the above description or shown in the accompanying drawing shall be interpreted in an illustrative and not a limiting sense. For example, transducers have been described herein as using an inner circular conductor and an outer annular conductor to form two variable capacitors. It will be appreciated that a variety of shapes for the conductors may be used, and also that more than two conductors may be used, in transducers constructed according to the invention. Further, a deposition controlling baffle may be constructed according to the invention to match any particular configuration of the conductors. As another example, referring to FIG. 5, the inner region I of baffle 250 is shown as having a greater area than that of the inner conductor 127a; and similarly, the middle region M of baffle 250 is shown as having a greater area than that of outer conductor 127b. It will be appreciated that there is considerable flexibility in defining the boundaries of the inner, middle, and outer regions of baffle 250. For example, the inner and middle regions I, M of baffle 250 can be defined as being coextensive with conductors 127a, 127b, respectively, such that the entire inner region I exactly underlies inner conductor 127a and such that the entire middle region M exactly underlies the outer conductor 127b. Alternatively, as suggested by FIG. 6B, the inner region I of baffle 250 can entirely underlie and be smaller than inner conductor 127a. Similarly, the middle region M of baffle 250 can entirely underlie and be smaller than outer conductor 127b. As yet another example, baffles having an I:M ratio of slightly greater than one have been discussed in the context of contaminants that cause an increase in capacitance. However, if transducers constructed according to the invention are used in environments in which contaminant deposition causes a decrease in capacitance, it can be desirable for the deposition controlling baffle to have an I:M ratio of slightly less than one (i.e., for the total area of apertures in the inner region I to be slightly less than the total area of apertures in the middle region M). Such a ratio will again tend to minimize zero shifts and to the extent that zero shifts occur, it will tend to ensure that the zero shifts are positive rather than negative. As yet another example, deposition controlling baffle 250 has been discussed as defining apertures in the inner region I, the middle region M, and the outer region O. However, deposition controlling baffles may be constructed and used in pressure transducers according to the invention that define apertures in only two out of three of the inner region I, the middle region M, and the outer region O. For example, such a deposition controlling baffle may define apertures in the inner region I and the outer region O and may define no apertures in the middle region M. Such a baffle can, for example, direct (a) most of the contaminants that pass through the baffle to the outer region O of the diaphragm, where they theoretically have little or no effect on the capacitance of any of the variable capacitors, and (b) a small portion of the contaminants that pass through the baffle to the inner region I of the diaphragm to ensure that any zero shift resulting from contaminant deposition is positive rather than negative. Similarly, a baffle that defines apertures in only the middle region M and the outer region O (and not in the inner region I) can be useful to ensure that any zero shifts resulting from contaminant deposition are positive rather than negative when the contaminants passing through the baffle are of the variety that lower, rather than raise, capacitance. Finally, baffles that define apertures in the inner region I and the middle region M, and do not define any apertures in the outer region O, may also be useful to for example balance all contaminant deposition in the active areas of the transducer. As yet another example, transducers have been discussed herein as having a conductive, or metallic, diaphragm 160. However, it will be appreciated that the diaphragm itself need not be conductive and may instead be made from non-conductive material such as ceramic. When such a non-conductive diaphragm is used, a conductive film is disposed on the diaphragm and the variable capacitors are formed by the conductive film on the diaphragm and by the conductors disposed proximal to the diaphragm.

What is claimed is:

1. A transducer, comprising:
   A. a housing defining an interior volume;
   B. a diaphragm disposed in the housing and dividing the interior volume into a first chamber and a second chamber, the diaphragm flexing in response to pressure differentials in the first and second chambers;
   C. an inner conductor disposed in the first chamber;
   D. an outer conductor disposed in the first chamber around the inner conductor; and
   E. a first baffle disposed in the second chamber, an inner region of the first baffle underlying the inner conductor, a middle region of the first baffle underlying the outer conductor, an outer region of the first baffle underlying neither the inner conductor nor the outer conductor, the first baffle defining apertures in at least two of the inner, middle, and outer regions.

2. A transducer according to claim 1, the first baffle defining apertures in each of the inner, middle, and outer regions.

3. A transducer according to claim 1, a total area of all the apertures in the inner region being substantially equal to a total area of all the apertures in the middle region.

4. A transducer according to claim 1, a total area of all the apertures in the inner region being greater than a total area of all the apertures in the middle region.

5. A transducer according to claim 1, a total area of all the apertures in the inner region being less than a total area of all the apertures in the middle region.

6. A transducer according to claim 1, the inner region of the first baffle being larger than the inner conductor.

7. A transducer according to claim 1, the inner region of the first baffle being smaller than the inner conductor.

8. A transducer according to claim 1, the middle region of the first baffle being smaller than the outer conductor.

9. A transducer according to claim 1, the middle region of the first baffle being larger than the outer conductor.

10. A transducer according to claim 1, a first unit area of the first baffle defining a first set of apertures, a second unit area of the first baffle defining a second set of apertures, a total area of the apertures in the first set being substantially equal to a total area of the apertures in the second set regardless of where the first and second unit areas are located.

11. A transducer according to claim 1, the first baffle comprising a sintered metal element.

12. A transducer according to claim 1, the transducer including an inlet tube, the inlet tube providing an opening into the second chamber.

13. A transducer according to claim 12, further including a second baffle disposed between the opening and the first baffle, a central region of the second baffle defining no apertures and being larger than the opening, the central region being disposed to prevent particles traveling through the opening in a direction parallel to the inlet tube from passing through the second baffle without first contacting the central region, a peripheral region of the second baffle being disposed around the central region and defining a plurality of apertures.

14. A transducer according to claim 13, further including a third baffle disposed between the first baffle and the second baffle, a central region of the third baffle defining no apertures, peripheral openings being provided between the third baffle and the housing, the third baffle being spaced apart from the second baffle by a gap, apertures in the peripheral region of the second baffle being separated from the peripheral openings by a length, the length being at least ten times greater than the gap.

15. A transducer according to claim 1, the inner conductor being circular, the outer conductor being annular, the inner and outer conductors being disposed generally parallel to the diaphragm.

16. A transducer according to claim 1, wherein the diaphragm is entirely metallic.

17. A transducer, including:
   A. a housing defining an interior volume;
   B. a diaphragm disposed in the housing and dividing the interior volume into a first chamber and a second chamber, the diaphragm flexing in response to pressure differentials in the first and second chambers;
   C. an inlet tube providing an opening into the second chamber,
   D. an inner conductor disposed in the first chamber, the inner conductor and at least a portion of the diaphragm being characterized by an inner capacitance;
   E. an outer conductor disposed in the first chamber around the inner conductor, the outer conductor and at least a portion of the diaphragm being characterized by an outer capacitance;
   F. a first baffle disposed in the second chamber, an inner region of the first baffle underlying the inner conductor, a middle region of the first baffle underlying; the outer conductor, an outer region of the first baffle underlying neither the inner conductor nor the outer conductor, the first baffle defining apertures in at least two of the inner, middle, and outer regions;
   G. a second baffle disposed between the opening and the first baffle, a central region of the second baffle defining no apertures and being larger than the opening, the central region being disposed to prevent particles traveling through the opening in a direction parallel to the inlet tube from passing through the second baffle without first contacting the central region, a peripheral region of the second baffle being disposed around the central region and defining a plurality of apertures; and
   H. a third baffle disposed between the first baffle and the second baffle, a central region of the third baffle defining no apertures, peripheral openings being provided between the third baffle and the housing.

18. A transducer according to claim 17, the first baffle defining apertures in each of the inner, middle, and outer regions.

19. A transducer, comprising:
   A. a housing defining an interior volume;
   B. a diaphragm disposed in the housing and dividing the interior volume into a first chamber and a second chamber, the diaphragm flexing in response to pressure differentials in the first and second chambers;
   C. an inner conductor disposed in the first chamber, the inner conductor being generally parallel to and spaced apart from the diaphragm, an inner portion of the diaphragm being proximal to the inner conductor;

D. an outer conductor disposed in the first chamber, the outer conductor being generally parallel to and spaced apart from the diaphragm, a middle portion of the diaphragm being proximal to the outer conductor, an outer portion of the diaphragm extending around the middle portion of the diaphragm; and E. a first baffle disposed in the second chamber, the first baffle defining an inner region, a middle region, and an outer region, the first baffle defining apertures in at least two of the inner, middle, and outer regions, the first baffle being disposed so that:
  i. a majority of molecules passing through apertures in the inner region of the first baffle towards the diaphragm contact the inner portion of the diaphragm before contacting any other part of the transducer;
  ii. a majority of molecules passing through apertures in the middle region of the first baffle towards the diaphragm contact the middle portion of the diaphragm before contacting any other part of the transducer; and
  iii. a majority of molecules passing through apertures in the outer region of the first baffle towards the diaphragm contact the outer region of the diaphragm before contacting any other part of the transducer.

20. A transducer, comprising:

A. a housing defining an interior volume;

B. a diaphragm disposed in the housing and dividing the interior volume into a first chamber and a second chamber, the diaphragm flexing in response to pressure differentials in the first and second chambers;

C. a first conductor disposed in the first chamber;

D. a second conductor disposed in the first chamber; and

E. a first baffle disposed in the second chamber, a first region of the first baffle being proximal to the first conductor, a second region of the first baffle being proximal to the second conductor, a third region of the first baffle underlying neither the first conductor nor the second conductor, the first baffle defining apertures in at least two of the first, second, and third regions.

21. A transducer according to claim 20, the first baffle defining apertures in each of the first, second, and third regions.

22. A transducer according to claim 20, wherein the diaphragm is entirely metallic.

* * * * *